(12) United States Patent
Hévizi et al.

(10) Patent No.: US 9,961,697 B2
(45) Date of Patent: May 1, 2018

(54) FLEXIBLE TRANSMISSION SCHEME FOR WIRELESS COMMUNICATION

(71) Applicant: Telefonaktiebolaget L M Ericsson (publ), Stockholm (SE)

(72) Inventors: László Hévizi, Piliscsaba (HU); Robert Baldemair, Solna (SE); István Gódor, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 175 days.

(21) Appl. No.: 14/402,005

(22) PCT Filed: Sep. 12, 2014

(86) PCT No.: PCT/SE2014/051054
§ 371 (c)(1),
(2) Date: Nov. 18, 2014

(87) PCT Pub. No.: WO2015/038056
PCT Pub. Date: Mar. 19, 2015

(65) Prior Publication Data
US 2016/0278114 A1 Sep. 22, 2016

Related U.S. Application Data

(60) Provisional application No. 61/877,444, filed on Sep. 13, 2013.

(51) Int. Cl.
*H04W 72/12* (2009.01)
*H04W 72/04* (2009.01)
*H04W 28/06* (2009.01)

(52) U.S. Cl.
CPC ... *H04W 72/1263* (2013.01); *H04W 72/1252* (2013.01); *H04W 72/1294* (2013.01); *H04W 28/065* (2013.01); *H04W 72/0413* (2013.01)

(58) Field of Classification Search
CPC ......... H04W 72/0413; H04W 72/0453; H04W 76/046; H04W 72/042; H04W 72/14;
(Continued)

(56) References Cited

U.S. PATENT DOCUMENTS 8,467,323 B2   6/2013   Perraud et al.
8,743,720 B2   6/2014   Lee et al.
(Continued)

FOREIGN PATENT DOCUMENTS

EP   2131619 A2   12/2009
EP   2351407      8/2011
(Continued)

OTHER PUBLICATIONS

R1-060394, Variable TTI for LTE, 3GPP TSG RAN WG1#44, Denver USA Feb. 13-17, 2006.*
(Continued)

*Primary Examiner* — Oussama Roudani
(74) *Attorney, Agent, or Firm* — Coats & Bennett, PLLC

(57) ABSTRACT

An object of the present disclosure is to provide a radio-layer mechanism, which brings the IP and radio protocol layers closer and simplifies the radio protocols for future mobile networks, so that the extreme high transmission speed that these networks will be capable of may be efficiently utilized. The object is achieved by a method (900) in an access point adapted to schedule transmissions of packets to and/or from a radio communication device. The method comprising determining (910) radio resources needed for at least one packet to be sent to a radio communication device, scheduling (920) the at least one packet without segmentation on radio resources, whereby all the necessary amount of radio resources that a transmission of the at least one packet will need can be scheduled at a time, and transmitting (930)

(Continued)

scheduling information indicating the scheduled resources to the radio communication device.

37 Claims, 9 Drawing Sheets

(58) Field of Classification Search
CPC .... H04W 28/06; H04W 48/12; H04L 1/1812; H04L 5/0007; H04L 5/0039; H04L 5/0058; H04L 1/0007; H04L 1/0026; H04L 1/1867; H04L 5/003; H04L 5/0055
See application file for complete search history.

(56) References Cited

U.S. PATENT DOCUMENTS

| | | | |
|---|---|---|---|
| 8,787,231 B2 | 7/2014 | Jeong et al. | |
| 8,824,347 B2 | 9/2014 | Pelletier et al. | |
| 8,908,714 B2 | 12/2014 | Vujcic | |
| 2003/0219037 A1 | 11/2003 | Toskala et al. | |
| 2007/0189332 A1 | 8/2007 | Phan et al. | |
| 2008/0267105 A1* | 10/2008 | Wang | H04W 52/0225 370/311 |
| 2010/0238877 A1 | 9/2010 | Nam et al. | |
| 2011/0103343 A1 | 5/2011 | Nishio et al. | |
| 2011/0170496 A1* | 7/2011 | Fong | H04L 5/0053 370/329 |
| 2011/0176466 A1 | 7/2011 | Lindoff et al. | |
| 2012/0014476 A1 | 1/2012 | Kuchi et al. | |
| 2012/0058791 A1 | 3/2012 | Bhattad et al. | |
| 2012/0106374 A1 | 5/2012 | Gaal et al. | |
| 2013/0083753 A1* | 4/2013 | Lee | H04W 72/0453 370/329 |
| 2013/0336270 A1* | 12/2013 | Nagata | H04W 16/28 370/329 |
| 2014/0362832 A1 | 12/2014 | Rudolf et al. | |

FOREIGN PATENT DOCUMENTS

| | | |
|---|---|---|
| KR | 20100051023 A | 5/2010 |
| WO | 2006002658 A1 | 1/2006 |
| WO | 2009024925 A2 | 2/2009 |
| WO | 2010053308 A2 | 5/2010 |
| WO | 2012048717 A1 | 4/2012 |
| WO | 2012131568 A2 | 10/2012 |
| WO | 2013006196 A1 | 1/2013 |
| WO | 2014168525 A1 | 10/2014 |
| WO | 2015038057 A1 | 3/2015 |

OTHER PUBLICATIONS

Motorola, "System simulation results with non-static TTI", 3GPP TSG RAN1 LTE Ad Hoc, Cannes, France, Jun. 27, 2006, pp. 1-8, R1-061715, 3GPP.

Motorola, "Variable TTI for LTE", 3GPP TSG RAN WG1#44, Denver, USA, Feb. 13, 2006, pp. 1-5, R1-060394, 3GPP.

Srinivasan R., et al., "IEEE 802.16m System Description Document (SDD)", Jul. 27, 2009, pp. 1-167, IEEE.

JHA, S. C., et al., "Optimization of Discontinuous Reception (DRX) for Mobile Internet Applications Over LTE",2012 IEEE Vehicular Technology Conference (VTC Fall), Sep. 3, 2012, pp. 1-5, Quebec City, QC, IEEE.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 11)", Technical Specification, 3GPP TS 36.321 V11.2.0, Mar. 1, 2013, pp. 1-56, 3GPP,France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.5.0, Mar. 1, 2013, pp. 1-209, 3 GPP, France.

* cited by examiner

FLEXIBLE TRANSMISSION SCHEME FOR WIRELESS COMMUNICATION

TECHNICAL FIELD

This disclosure relates to future radio networks and specifically to methods and apparatuses for transmissions in a wireless communications network. In particular, embodiments herein relate to a method and an access point for scheduling transmissions of packets to and/or from a radio communication device and a method and a radio communication device for receiving scheduling information from an access point.

BACKGROUND

Radio communication devices such as User Equipments, UEs, are enabled to communicate wirelessly in a radio communications system, sometimes also referred to as a radio communications network, a mobile communication system, a wireless communications network, a wireless communication system, a cellular radio system, or a cellular system.

The communication may be performed, e.g., between two user equipments, between a user equipment and a regular telephone, and/or between a user equipment and a server via a Radio Access Network, RAN, and possibly one or more core networks, comprised within the wireless communications network.

Radio communication devices are also known as e.g., UEs, mobile terminals, wireless terminals, terminals and/or mobile stations, mobile telephones, cellular telephones, sensors and actuators with wireless capabilities, or laptops with wireless capability, just to mention some examples. The UEs in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, with each cell area being served by a network node such as a Base Station, BS, e.g. a Radio Base Station, RBS, which sometimes may be referred to as e.g. eNB, eNodeB, NodeB, B node, Base Transceiver Station, BTS, access node, or access point, depending on the technology and terminology used. The base stations may be of different classes such as, e.g., macro eNodeB, home eNodeB, or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

FIG. 1 shows a conventional Long-Term Evolution, LTE, protocol stack for downlink, which is used for general data communications. As shown in FIG. 1, Radio Link Control, RLC, and Medium Access Control, MAC, layers have packet manipulation, segmentation and concatenation, and retransmission functionalities. These protocol layers together pack user data into physical layer containers and take care of retransmissions in case of failed transmissions. The size of the physical layer containers and their transmission schedule, including their Transmit Time Intervals, TTIs, have to fit the basic fixed time framing hierarchy. Transmission blocks may vary in size, and they may accommodate full Internet Protocol, IP, packets, but typically they will only accommodate part of the IP packets. The transmission blocks are subject to Hybrid Automatic Repeat Request, HARQ, in case of failed delivery.

Scheduling information, such as for example, the allocation of time and/or frequency and/or antenna resources, is conveyed from a Base station, e.g. an eNodeB, to a terminal, e.g. a UE, via shared or dedicated control channels, which are closely monitored by all active terminals, e.g., all active UEs. The scheduling period, i.e., the TTI in LTE is the subframe, which is, e.g. 1 ms long. By reading the scheduling information at the beginning of each subframe, a UE may know during which time periods to receive or transmit signals.

There are further procedures in LTE and Universal Mobile Telecommunications System, UMTS, such as Discontinuous Reception, DRX, which allow less busy UEs to enter dormant cycles, when they read control channels less frequently and hereby can save battery power.

Transmission characteristics are different over wireline and mobile networks, and communications designed for IP networks do not match the protocol stack of mobile networks, which has a protocol stack that implement functionalities related to the nature of radio communications and user mobility. A typical solution to extend traditional wireline data communications to wireless nodes is to insert adaptation mechanisms between the IP protocol stack and the radio network protocol layers. That adaptation entirely hides the wireless network details for applications running over IP or similar networks. However, the interworking of wireline and wireless networks may suffer from performance degradation and inefficiency for many applications. Cross-layer optimization between the IP and mobile network protocol stacks becomes particularly important for future radio networks, which approach wireline networks in transmission speeds.

Mobile networks employ framing in their physical layers, so they have multilevel time periodicity, e.g., a hierarchy of superframes, frames, and subframes, so transmissions in either uplink or downlink directions are organized around this framing. The size of the data containers, the scheduling, and the TTIs are all matched to the given frame structure. In the transmission scheme in LTE, the IP packets are segmented on the wireless layer to fit the size in a container of physical layer transmission blocks. This means that the IP packets may need to be split up to fit in the available container set. By dividing the IP packets there is a risk that not all packets arrive successfully at the receiver, which leads to out-of sequence arrival and delays.

The wireless protocol layers in LTE barely know anything about the processes and connection states in IP level. The wireless layers might be aware of the Quality-of-Service, QoS, class and packet-delivery requirement, e.g. if in-order, lossless delivery is aimed for. But in today's mobile networks, for example, simultaneous retransmissions of the same information piece may happen over the TCP/IP and wireless layers. Also the interruptions caused by handovers can severely impact the flow control mechanisms of Transmission Control Protocol, TCP, and as a consequence, UEs cannot utilize the bandwidth that the wireless links can provide.

Scheduling information, such as the assignment of time and/or frequency and/or antenna resources, is continuously transmitted on shared or dedicated channels, which means there is power waste. Recent modifications to existing standards introduce Discontinuous Reception, DRX, and/or Discontinuous Transmission, DTX, features to provide a more power-economic mode.

SUMMARY

As described in the background section, the size of data containers, the scheduling, and the fix transmit time intervals are all matched to the given frame structure, and that may pose limits in high-speed data communications.

One of the major drawbacks in current cross-layer interworking is that large IP packets are chopped up into radio protocol-layer entities when they travel through the wireless links and they must be reassembled on the receiver sides. Moreover, the transmission speed over wireless links is strongly variable; interruptions in transmissions and rerouting of links inevitably occur due to user mobility. Thus, the radio layer protocols cannot pass data segments in time and order to the upper layer.

It is an object of embodiments described herein to address at least some of the problems described above and to provide a radio-layer mechanism, which brings the IP and radio protocol layers closer and simplifies the radio protocols for future mobile networks, so that the extreme high transmission speed that these networks will be capable of can be efficiently utilized.

According to a first aspect of embodiments herein, the object is achieved by a method in and/or for an access point adapted to schedule transmissions of packets to and/or from a radio communication device. The method determines radio resources needed for at least one packet to be sent to a radio communication device. The method then schedules the at least one packet without segmentation on radio resources, whereby all the necessary amount of radio resources that a transmission of the at least one packet will need can be scheduled at a time. Then, the method transmits scheduling information indicating the scheduled resources to the radio communication device. In some embodiments, determining radio resources needed comprises determining a number of Atomic Scheduling Units needed in time domain and/or frequency domain based on the size of the at least one packet. In some embodiments, the scheduling information is transmitted to the radio communication device in beginning of a frame, said frame being a time interval used for data transmission on the radio physical channel. In some embodiments, the scheduling information indicates scheduled resources in the same frame as the frame where the scheduling information is transmitted. In some embodiments, the scheduling information indicates scheduled resources in subsequent frames to the frame where the scheduling information is transmitted.

According to a second aspect of embodiments herein, the object is achieved by an access point which is configured to perform the embodiments according to the first aspect above.

According to a third aspect of embodiments herein, the object is achieved by a method in and/or for a radio communication device adapted to receive scheduling information from an access point. The method receives scheduling information from the access point and the scheduling information indicates resources scheduled for at least one packet, whereby all the needed resources are scheduled at a time. In some embodiments, the scheduling information is received in beginning of a frame, said frame being a time interval used for data transmission on the radio physical channel. In some embodiments, the scheduling information indicates scheduled resources in the same frame as the frame where the scheduling information is received. In some embodiments, the scheduling information indicates scheduled resources in subsequent frames to the frame where the scheduling information is received. In some embodiments, the method determine, based on the received scheduling information, during which resources the radio communication device is scheduled and based on this determining during which resources the radio communication device is able to sleep.

According to a fourth aspect of embodiments herein, the object is achieved by a radio communication device which is configured to perform the embodiments according to the third aspect above.

According to a fifth aspect of embodiments herein, the object is achieved by a computer program, comprising instructions which, when executed on at least one processor, cause the at least one processor to carry out the method according to the first aspect above. In some embodiments the computer program is contained in a carrier, wherein the carrier is one of an electronic signal, optical signal, radio signal, or computer readable storage medium.

According to a sixth aspect of embodiments herein, the object is achieved by a computer program, comprising instructions which, when executed on at least one processor, cause the at least one processor to carry out the method according to the third aspect above. In some embodiments the computer program is contained in a carrier, wherein the carrier is one of an electronic signal, optical signal, radio signal, or computer readable storage medium.

According to a seventh aspect of embodiments herein, the object is achieved by an access point comprising a determining module configured to determine radio resources needed for at least one packet to be sent to the radio communication device, a scheduling module configured to schedule the at least one packet without segmentation on radio resources, whereby all the necessary amount of radio resources that a transmission of the at least one packet will need can be scheduled at a time, and a transmitting module configured to transmit scheduling information indicating the scheduled resources to the radio communication device.

According to an eight aspect of embodiments herein, the object is achieved by a radio communication device comprising a receiving module configured to receive scheduling information from the access point, where the scheduling information indicates resources scheduled for at least one packet, whereby all the needed resources are scheduled at a time.

Modifications and other variants of the described embodiments will come to mind to one skilled in the art having the benefit of the teachings presented in the foregoing descriptions and the associated drawings. Therefore, it is to be understood that the embodiments should not be limited to the specific examples disclosed herein and that the modifications and other variants are intended to be included within the scope of this disclosure. Although specific terms may be employed herein, they are used in a generic and descriptive sense only, and not for purpose of, limitation.

An advantage with embodiments described herein is that the radio network protocols, processing and the retransmission schemes may be simplified and hence, packet delay and loss rate may be lowered.

Another advantage with embodiments described herein is that the radio communication devices can more efficiently switch to a power-economic mode when they are not scheduled for transmission or reception. Hence, some of the embodiments described herein reduce the power consumption.

DETAILED DESCRIPTION

Figure 1:
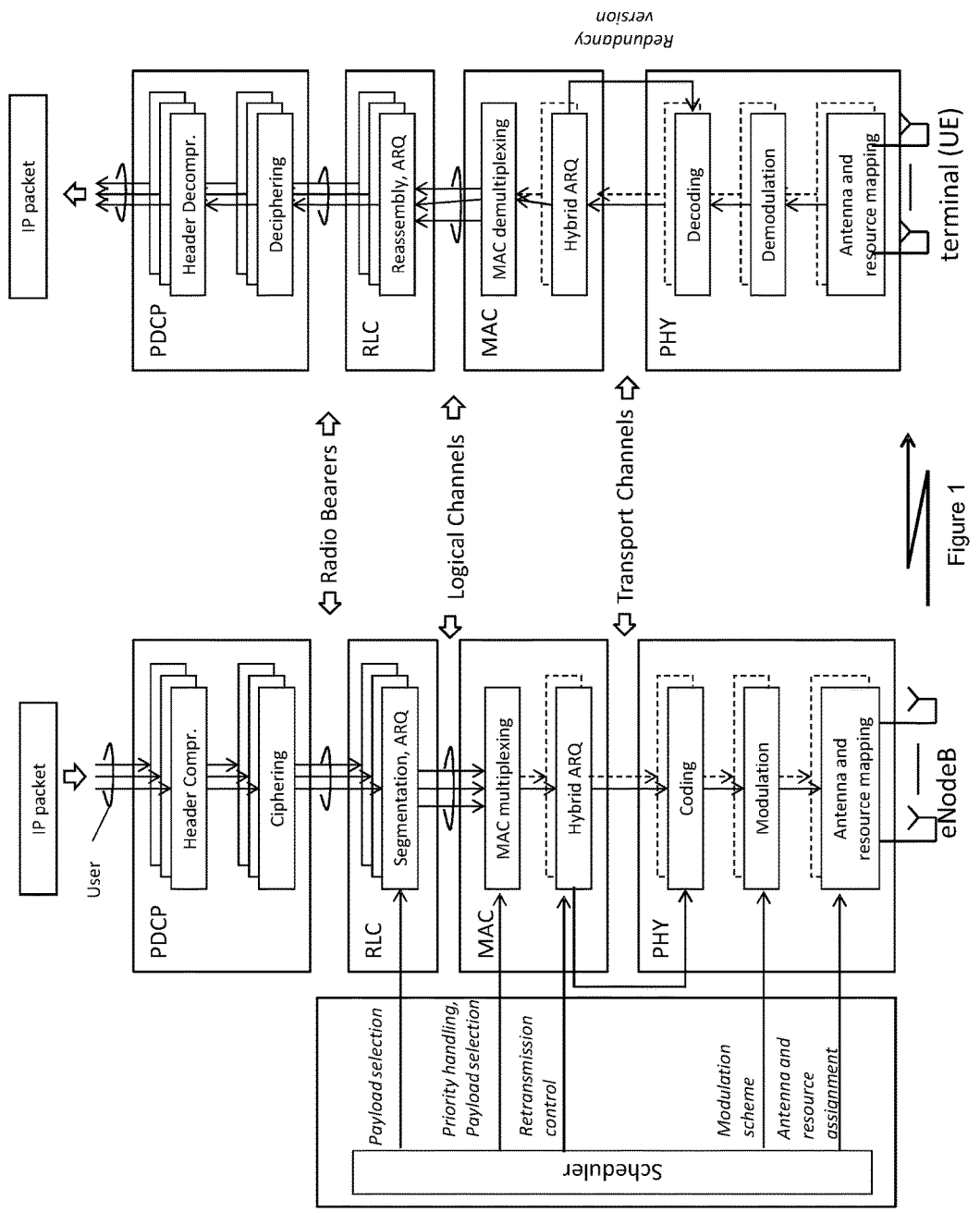
FIG. 1 shows a conventional LTE protocol architecture, in downlink.

Embodiments described herein provide a radio-layer mechanism, which brings the IP and radio protocol layers closer and simplifies the radio protocols for future mobile networks, so that the extreme high transmission speed that these networks will be capable of can be efficiently utilized.

According to one embodiment, an IP packet smaller than the wireline Maximum Transfer Unit, MTU, size should not be segmented by the wireless protocols even if the available physical layer container size of schedulable resources is smaller than the one that the packet would need. Instead, all the necessary amount of radio resources that the transportation of the packet will need should be scheduled at a time, even if part of these resources is only available in consecutive scheduling cycles. Hence, according to one embodiment, the fix transmission scheme, with fixed Transmit Time Interval, TTI, as described in the background, is replaced or extended by a flexible transmission scheme, with flexible TTI, which enables scheduling to go beyond the boundaries of subframes or even frames.

The Maximum Transfer Unit, MTU, is the largest possible block that comes from higher layers; e.g. in Ethernet an MTU is 1492 or 1500 bytes and as an additional example, an Ethernet Jumbo Frame has a size of 1501-9198 bytes. The MTU may also be referred to as the Maximum Transmission Unit.

In LTE the transmission scheme is fixed, because the TTI is fixed. Thus, that the transmission scheme is fixed is referring to that the Transmit Time Interval, TTI is fixed. One TTI corresponds to one subframe, which is 1 ms. In the flexible transmission scheme, as disclosed in embodiments herein, the amount of scheduled time is flexible, i.e., the TTI is flexible. The IP packets may be scheduled on radio resources without dividing the packets into smaller parts to fit in one subframe. The IP packets may be scheduled in as many subframes as needed, since the TTI is flexible.

The term flexible as used in embodiments herein should be interpreted to mean something that is variable, non-fixed, adaptable, dynamic, or adjustable.

The radio network protocols, processing, and the retransmissions may be simplified when the limitations posed by the container sizes of fixed TTI transmission blocks is removed.

In some embodiments, when the access technologies have more bandwidth available, i.e., future radio access technologies, than the technologies known today has, the transport blocks may be larger, and the MTU may thus also be larger. This would mean that segmentation and reassembly of IP packets may be avoided and retransmissions simplified when applying the embodiments as described herein.

According to another embodiment, it is enabled to keep the traditional control message structure, meaning that scheduling and uplink grant messages go on shared channels and there are random access slots to request uplink resources. According to some embodiments, some parts of the scheduling and granting messages may be placed on dedicated channels. Moreover, these messages may tag directly, e.g. be transmitted together with, user-data and/or reception acknowledgements. This arrangement is possible, while a continuous communication exists between sender and recipient, i.e., the protocol buffers for uplink, downlink, or both contain packets. The dedicated downlink transmissions may contain scheduling information for the next downlink or uplink transmission, and uplink transmissions can provide buffer status reports or requests for uplink transmission grants. If a communication between an access point and a radio communication device stops either normally or due to faulty delivery, the communication can be resumed via the regular control message scheme. In some embodiments, in addition to the shared control channel, dedicated control messages, which are sent on dedicated control channels, can be used. Resources dedicated to a user might be set aside for downlink, DL, scheduling and scheduling request on Uplink, UL. In LTE, the dedicated control channel is referred to as PDCCH, but in other communication systems other terms may be used.

Reorganizing control channels such that scheduling information is partially conveyed on dedicated channels, i.e. scheduling information is partially conveyed together with other user and/or control data, permits further improvements in power efficiency. High-frequency radio access technologies, e.g., ones operating in the mmW bands, need directional beams to provide the targeted bit rates at reasonable distances. Control messages on dedicated channels may take advantage of the directional antenna gain compared to messages sent on shared channels via wide antenna beams. According to some embodiments, by conveying scheduling directly and individually to each radio communication device, the radio communication devices can more efficiently switch to power-economic mode when they are not scheduled for transmission or reception.

The access point as described herein may also be referred to as an access node or a base station.

The radio communication device as described herein may be any device comprising a radio receiver and is not limited to the following examples of a User Equipment, UE, a mobile terminal, a terminal, sensors and/or actuators with wireless capabilities or a machine.

According to some embodiments, the smallest schedulable radio resource is called an Atomic Scheduling Unit, ASU. The ASU may also be referred to as a resource block. Any scheduling concept has to consider the granularity of the available resources and to optimize the schedulable chunks accordingly. As an example, if the ASUs are very small, the control signaling would be very large since it needs to address a large number of small ASUs. On the other hand, if the ASUs are very large, the control signaling decreases but resources might be wasted since the ASUs might not be filled up. The ASU, which may also be called the atomic spectral-time scheduling unit, is calculated as the "product" of bandwidth and time units, and capacity-wise multiplied with the achievable spectral efficiency. As an example, the ASU may be calculated according to $ASU=BW_{ASU}*(1\ sub\ frame)$, where $BW_{ASU}$ represents the bandwidth of the ASU. As a specific example when the bandwidth is 100 MHz and 1 subframe is 12.5 µs, the ASU is calculated as 100 Mhz*12.5 µs. According to some embodiments, the ASUs may be scheduled both in Frequency-Division Multiplexing, FDM, and Time-Division Multiplexing, TDM, fashion, and the notions of subband and subframe, or some equivalent quantities, are defined in the future radio access technology as they are in LTE. Hence the radio resource unit defined by the subband and subframe is the atomic schedulable resource.

According to some embodiments, the ASU is the smallest spectral unit, defined by time and bandwidth, which can be scheduled at a time to any radio communication device either in the UL or DL. A transport block actually sent to or received from one particular radio communication device in one piece over the radio may include an integer number of ASUs. According to some embodiments, the number of allocated ASUs is not limited by radio subframe or frame boundaries. According to some embodiments, the ASU size may be selected to be optimal for IP control packets. In some embodiments the ASU may be a system constant. In some embodiments the ASU may not correspond one-to-one to the subband organization of Orthogonal Frequency-Division Multiplexing, OFDM, technology. In some embodiments, the ASU may be several OFDM subcarriers wide.

According to some embodiments, the capacity of an ASU is at least large enough to accommodate control information and smaller IP packets, including radio network protocol encapsulation and coding, at a moderate level of spectral efficiency.

The MAC layer of the access point is able to concatenate an arbitrary, reasonably large number of ASUs into one scheduled entity, in the frequency domain and/or in the time domain, to create large transmission blocks capable of carrying large IP packets, or even blocks of concatenated IP packets. In some embodiments, the concatenation of ASUs may not be continuous in the time and/or frequency domains and can reach over frame boundaries. According to some embodiments it is preferred that the MAC layer of the access point concatenates the ASUs in the frequency domain.

However, according to some embodiments, the length of the scheduling units is upper bounded by the round-trip time targeted by the system in order to speed up the propagation time of error notifications and corrections in wireless networks.

According to some embodiments, flexibly long scheduling units could carry full-size and aggregated IP packets better than, e.g., LTE, so the relative control information overhead, as associated with segmentation, scheduling, modulation coding format description and acknowledgement information can be decreased. That is, avoiding segmentation of packets speeds up MAC and simplifies retransmissions and this is essential for high Transmission Control Protocol, TCP, throughput.

Consequently, flexibly long scheduling units, and thus a flexible transmission scheme, improve spectrum utilization, and therefore, increases the system capacity.

In some embodiments, having flexible long scheduling units means that how many, in the time domain and/or in the frequency domain, ASUs needed to transmit certain IP packets may be determined based on the size of the IP packets. And depending on the size of the IP packet different numbers of ASUs are needed. Because the TTI is flexible, it is possible to use as many ASUs, in the time domain and/or in the frequency domain, as needed. This results in flexible long scheduling units and a flexible transmission scheme. According to some embodiments, the availability of ASUs is not limited by subframe or frame borders.

With flexible transmission schemes and in-band scheduling, the same amount of user information is transferred in shorter time, and both the access point and radio communication device, can efficiently employ Discontinuous Transmission, DTX, and Discontinuous Reception, DRX, schemes, which lowers power consumption. In some embodiments, in-band scheduling means that scheduling information is transmitted on a dedicated channel which directly tailgating user data transmissions.

Figure 2:
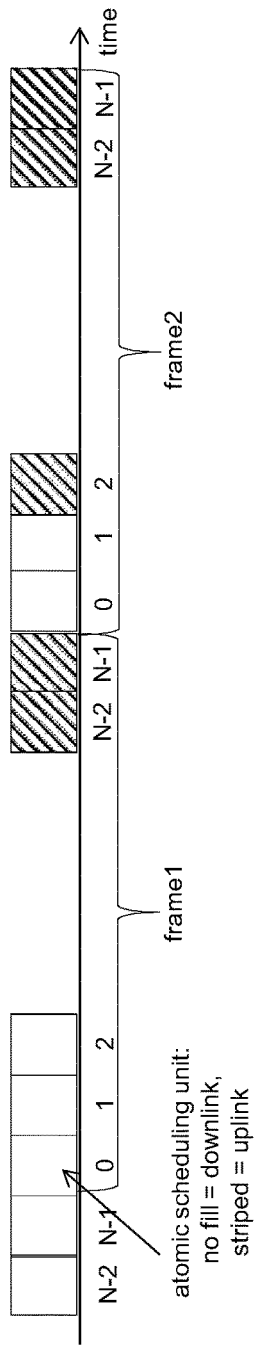
FIG. 2 shows a frame structure in time domain of data channels without control channels.

FIG. 2 shows the frame structure in the time domain of data channels without control channels of a radio network. The frame structure in FIG. 2 is a basic TDD, Time Division Duplexing/TDM, Time-Division Multiplexing, frame structure. In FIG. 2 only the time-domain is shown, i.e., in this figure one ASU spans the complete system bandwidth. Referring to FIG. 2, each frame comprises N subframes, hence N Atomic Scheduling units, ASUs, ranging from 0 to N−1. In the first frame, referred to as frame1 in the figure, the first three ASUs, referred to as 0, 1 and 2, contains downlink, DL, transmissions and the last two ASUs, referred to as N−2 and N−1, contains uplink, UL, transmissions. In the second frame, referred to as frame2 in the figure, the first two ASUs, referred to as 0 and 1, contains DL transmissions and the third ASU and the last two ASUs, referred to as 2, N−2 and N−1, contains UL transmissions.

In the fixed TTI concept, also referred to as a fix transmission scheme herein, which is previously known and described in the background section, the radio communication device wakes up at each TTI and checks for scheduled data.

According to some embodiments there are hardware implementations that allow radio communication devices to efficiently sleep when there is no data to transmit or receive.

According to one embodiment, a basic flexible transmission scheme is set so that the radio communication device listens to scheduling information at time instances when $modulo(n+\Delta,L)=0$, where n represents the time index, $\Delta$ represents an offset, which may be tunable per radio communication device, and L represents the periodicity, which may be tunable per radio communication device. In some embodiments, the offset $\Delta$ may be set as 0 as a default. Moreover in some embodiments, an assignment may be longer than a subframe, or it can start later in a radio frame or even continue into the next radio frame. The periodicity, L, may be received and/or obtained from an access point. The periodicity, L, may be able to be customized or reconfigurable for the wireless device.

According to some embodiments, the scheduling information sent to a particular UE via shared control channel may contain the time designation of the next control message that the UE needs to monitor, hence the transmit time interval can be freely variable for individual UEs both in uplink and downlink and the UEs can enter sleep mode in the time between scheduled transmissions or receptions until the next control message they are scheduled to monitor.

According to some embodiments, the sleep mode is further exploitable if the scheduling and control information intended for the target radio communication device is sent directly to the radio communication device in a dedicated communication. In some embodiments, while the access point maintains a communication with the radio communication device, i.e. while there is data to transmit either in downlink or uplink, the access point includes the scheduling information of the next transmission in each downlink transmission, hence the radio communication device can skip all subframes between transmissions and scheduled transmissions can virtually go over frame boundaries. These embodiments relating to dedicated communication leads to a fully flexible transmission scheme during active periods, since the scheduling information may point to subframes in subsequent frames. Thus, in-band scheduling, i.e., the dedicated communication referred to above, tells the next time of activity, which means that an arbitrary TTI can be realized anytime. The fully flexible transmission scheme may supplement the basic flexible transmission scheme, where the scheduling information may point to subframes within the frame and where the radio communication device reads the scheduling information at the beginning of a frame. According to some embodiments, the frame is the fundamental period of organizing transmissions and channels, especially, in wireless communications. E.g. the frame may be a time interval used for data transmission on the radio physical channel. The duration of the frame may be different for different radio communication systems. As an example, in some radio communication systems, such as LTE, a frame has 10 ms duration.

In some embodiments, the transmission scheme is predefined in a radio communication system. As described in the background section, LTE, which is a radio communication system, only supports a fixed transmission scheme because the TTI is fixed. As another example, a certain radio communication system may only support flexible transmission schemes. In some embodiments the transmission scheme is configured based on signals received from the network.

In some embodiments, it is possible to use both fixed and flexible transmission schemes, in a radio communication system, in parallel for radio communication devices with different capabilities. In those embodiments, the access point needs to negotiate with each radio communication device whether the radio communication device is able to interpret scheduling information which has been created based on a flexible transmission scheme.

In some embodiments, such dedicated communication, as mentioned above, between an access point and a radio communication device has to be augmented with fast random access and paging procedures in order to keep the setup time for the communications short. It may be desired that random access slots are available for attached radio communication devices with empty uplink and downlink buffers in each radio frame. As a specific example, it may be desired that random access slots are promptly, e.g. in each radio frame, available for attached radio communication devices with the arrival of new packets into empty uplink and downlink buffers. The spectral resource needed for random access is negligible, while the chance for conflict-free access is better with frequent slots. This trade-off in allocating random access slots can be dynamically controlled in the network. In some embodiments, instead and/or additionally, even if there is no ongoing communication between an access point and a radio communication device, dedicated control signaling can be used. Such control signaling could be PDCCH-like in the DL, and scheduling requests in the UL. As an example, in LTE such control signaling could be PDCCH in the DL and PUCCH in the UL. In other communication systems other terms may be used instead.

In some embodiments, the access point initiates a communication in case new data arrives in the downlink direction. Sleeping radio communication devices do not need to monitor each paging slot; a wake up period can be dynamically and individually negotiated for each radio communication device. These embodiments may be related to basic flexible transmission schemes.

In some embodiments, to convey scheduling information, a hybrid mechanism of a basic flexible transmission scheme and a fully flexible transmission scheme could be used, depending on whether there is an ongoing communication between the access point and the radio communication device or if a new communication is to be started, e.g., if radio communication device has been idle for some time.

According to some embodiments, the scheduling information is sent from an access point to a radio communication device in the beginning of each frame, e.g., in the first or first few ASUs. According to some embodiments, this scheduling information describes on which ASUs a radio communication device may find data on the DL, or is allowed to transmit on the UL.

According to some embodiments the ASUs within a range of 0 to N−1 will be scheduled. N may be the number of subframes per frame, which is also illustrated in FIG. 2. ASUs may be contiguous in time or not. According to some embodiments the first part of a frame is DL, while the second part of a frame is UL. At which ASU, the Downlink/Uplink split happens is flexible. The transmission scheme described herein may be described as a flexible transmission scheme because the split between the UL and DL in a frame is flexible and may be different for different radio communication devices, i.e., users. In some embodiments many ASUs spanning more than one frame may be scheduled. According to some embodiments, at which ASU the Downlink/Uplink split happens is flexible and it may change from frame to frame. The transmission scheme described herein bears extra flexibility because it can adapt to asymmetric UL and DL traffic. In some embodiments a number of ASUs spanning more than one frame may be scheduled and the scheduled ASUs in DL or UL are not contiguous.

According to some embodiments, depending on whether scheduled ASUs must be consecutive, the scheduling information can be encoded differently. In some embodiments, e.g. in case of non-contiguous allocation, a bit map of allocated ASUs might be required. The size of the bit map equals to the layout of ASUs in the frequency-time axes for the scheduled period and the elements of the bit map logically signal the allocated ASUs. In some embodiments a simple run-length encoding is sufficient, whereas in other embodiments more complex encoding might be required. Run-length encoding is a very simple form of data compression in which runs of data, that is, sequences in which the same data value occurs in many consecutive data elements, are stored as a single data value and count, rather than as the original run.

According to some embodiments, the access point has one/multiple IP packets to transmit to a radio communication device. In some embodiments, the access point determines and/or schedules the radio resources required to transmit the IP packet. The length of the flexible TTI is the length of the scheduled resource in the time domain. In the beginning of a frame, scheduling information is sent to the radio communication device. In a later part of the frame, and potentially even in subsequent frames, data corresponding to the IP packet is sent. If multiple frames are needed, scheduling information for frame n+1 is either sent in-band in frame n, or in the beginning of frame n+1. According to some embodiments, the scheduling information for frame n+1 is sent in-band in frame n−1 or in n−2 or in any previous frame. Thus, the scheduling information may indicate scheduled resources in subsequent frames to the frame where the scheduling information is transmitted. If the IP packets are very small and the access point has multiple IP packets, they can be aggregated. Otherwise, the same scheduling procedure applies.

According to some embodiments, the access point assigns a number of resources that can be used by the radio communication device. The length of the flexible TTI is the length of resources in time domain.

According to some embodiments, a radio communication device receives scheduling information in the beginning of a frame. From this it knows when to sleep or be awake. The radio communication devices may be allowed to sleep when there is no data to transmit or receive. The scheduling information may in some embodiments contain information during which resources the radio communication device is scheduled, and thus the radio communication device also knows during which resources it is not scheduled. Hence, the radio communication device may, according to some embodiments, sleep during those resources that it is not scheduled.

According to some embodiments, if the radio communication device is scheduled for multiple frames, the radio communication device has to read scheduling information for the next frame as well. In some embodiments, if multiple frames are needed, the scheduling information for frame n+1 may be received in-band in frame n. In some embodiments the scheduling information for frame n+1 may be received in-band in frame n−1 or in any other previous frame. In other embodiments the scheduling information for frame n+1 may be received at the beginning of frame n+1.

Figure 3:
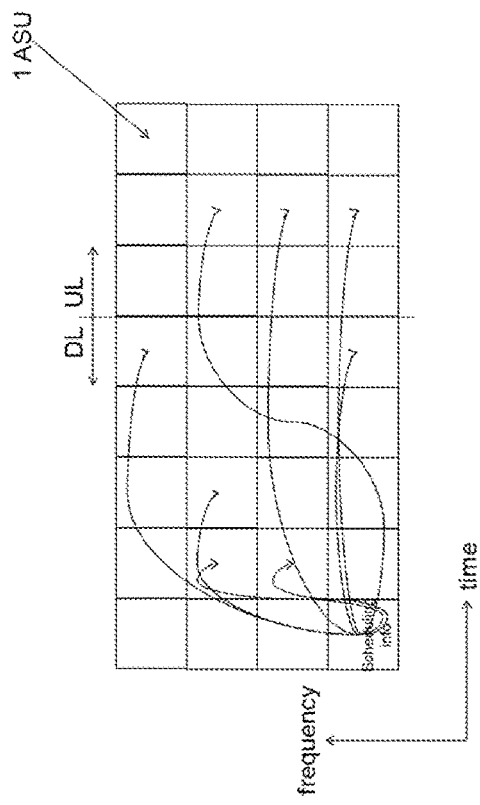
FIG. 3 shows exemplary ASUs in time and frequency domain.

In FIG. 2, as already described earlier, only the time-domain is shown, i.e., in this picture one ASU spans the complete system bandwidth. However, the embodiments described herein also apply if FDM is supported. For example, in some embodiments many fractions of system bandwidth may be scheduled, where one ASU corresponds only to a fixed fraction of the system bandwidth, shown in FIG. 3. In this case the scheduling information must also contain information regarding which ASUs, with respect to frequency, are scheduled. In the simplest case, the frequency position is constant during the DL part of the frame and constant during the UL part of the frame. In FIG. 3, the ASU in the left corner contains the scheduling information and the arrows pointing to other ASUs in the figure indicates which ASUs that are scheduled, both in DL and UL.

According to some embodiments, flexibility, as shown FIG. 3, with respect to frequency-domain, are also supported. FIG. 3 shows exemplary ASUs in time and frequency domain.

According to some embodiments flexibility means varying the ASU location in the time and frequency domains. Again, depending on the allowed flexibility, encoding of scheduling information ranges from simple to more complex schemes. According to some embodiments, it is possible to use joint encoding schemes, where the time and frequency location of scheduled ASUs are encoded together, e.g. by bit map or run-length encoding.

Figure 4:
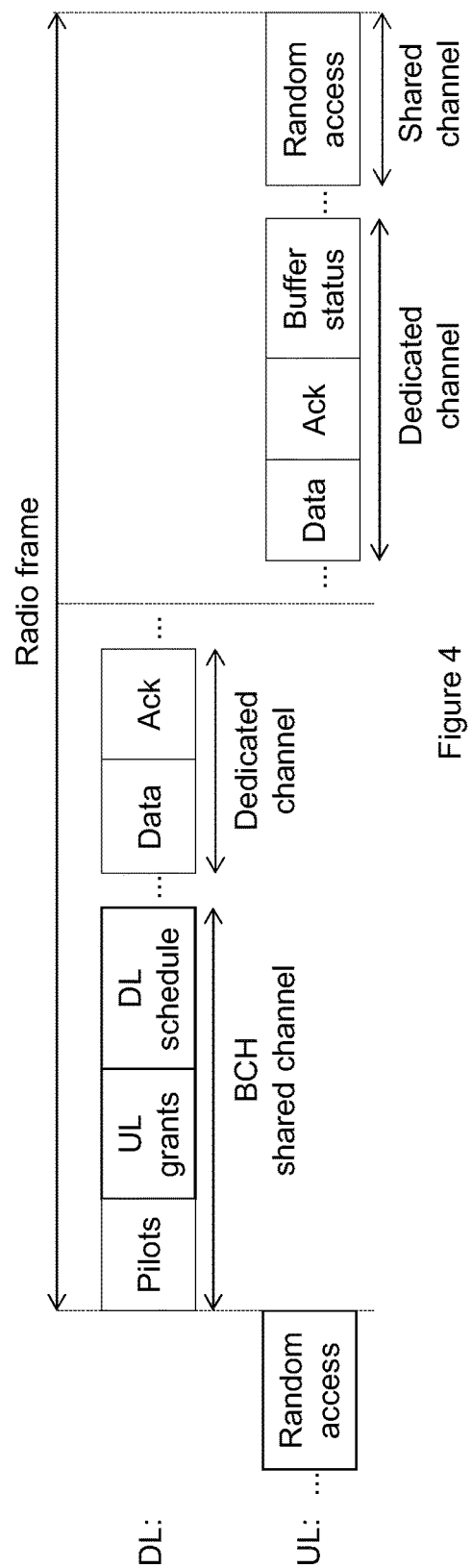
FIG. 4 shows a TDD frame structure, when scheduling information is conveyed over shared channels.

FIG. 4 shows a simple Time Division Duplexing, TDD, frame structure, both in the DL and the UL. The figure illustrates scheduling via shared channels, which is the basic method when user data arrives either for UL or DL transmission with previously empty UL and DL buffers. It is also the fallback method if more advanced scheduling methods are not working properly. In UL, the access point may receive a request in a random access slot, depicted as random access in the figure, just before the beginning of the depicted radio frame. The random access slot is a shared UL channel advertised by the access point and used by attached and not yet attached radio communication devices to initiate communication with the access point. In DL, the access point may then transmit UL grants, DL schedule and Pilots. These signals are transmitted on BCH DL shared channel and monitored by attached and not yet attached radio communication devices. The monitoring is intermittent for devices residing in sleep mode. The UL grants indicates which resources that may be used for a specific radio communication device to transmit to the access point. The DL schedule indicates on which resources that the access point will transmit data. The access point may then later transmit user data, depicted data in the figure, and/or acknowledgements, depicted Ack in the figure, for previous receptions on dedicated channels. In UL the access point may then receive Data and Acknowledgements, Ack, and Buffer status on dedicated channel. In the end of the radio frame in UL the access point may receive a new Random Access request on the shared UL channel. In some embodiments, the shared UL channels are placed at different positions of the frame, i.e. it doesn't have to be in the end of the frame.

The random access slots can be combined with UL measurement beacons, which allow the estimation of the path loss for radio communication device to radio communication device as well as for radio communication device to access point. The random access slots can be combined with training pilots to steer antenna beams. By collecting centrally these measurements, the access points can arrange their cooperation, and they can schedule simultaneous transmissions, which do not interfere with each other.

According to some embodiments several access points serve a common area and use the same spectral channel. Then the access points and radio communication devices may need to coordinate their operations to avoid or minimize interference. In the first step they coordinate frame structure and subband allocation. In the next step, the access points with overlapping coverage coordinate their scheduling. Synchronization among access points becomes more complex if the access points are involved in self-backhauling links. According to some embodiments, such access points tightly coordinate their frame structures over short timescales, e.g. over a few radio frames. Based on the instantaneous buffer measurements, the access points agree on a common frame arrangement, which should include the subframes allocated for UL, DL, and self-backhaul.

Figure 5:
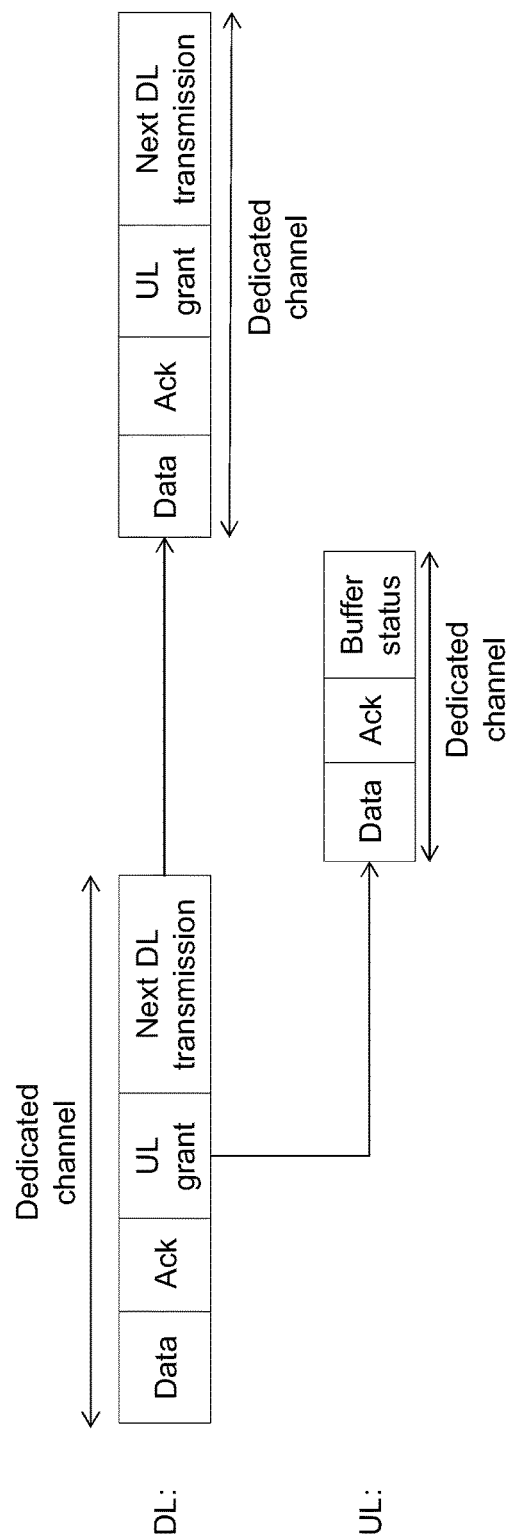
FIG. 5 shows an exemplary flexible mechanism, when scheduling information is conveyed over dedicated channels.

According to some embodiments the transmission scheme can be fully flexible as shown in FIG. 5, once a communication is running between the access point and the radio communication device. FIG. 5 shows an exemplary flexible mechanism to control ongoing communications between the access point and the radio communication device. As illustrated as an example in FIG. 5, the access point may, in DL, transmit Data, an acknowledgement, Ack, UL grant and information about next downlink transmission, together on a dedicated channel. This may also be referred to as in-band scheduling. The information about the next downlink transmission is depicted Next DL transmission in the figure. The UL grant indicates which resources that may be used for a specific radio communication device to transmit to the access point. In UL, the access point may receive Data, Ack and Buffer status on the resources that was previously indicated by the UL grant in DL, also on a dedicated channel.

According to some embodiments, the scheduling information is appended to the packets sent to radio communication device. This may be supported by reserving some room for such dedicated information in the ASU or via "in-band" signaling in general. In FIG. 5, the scheduling information corresponds to the UL grant and the Next DL transmission. An advantage of direct control signaling may be that it is very efficient, especially time-slot-wise, which is very important in TDD systems. Another advantage of direct control signaling between the access point and the radio communication device may be that both sides can use directional beams for the L1/L2 messages. This embodiment is well suited for continuous transfers with high bit rates, where buffers are not empty. Frequent random access and paging slots according to FIG. 4 are still needed.

Figure 6:
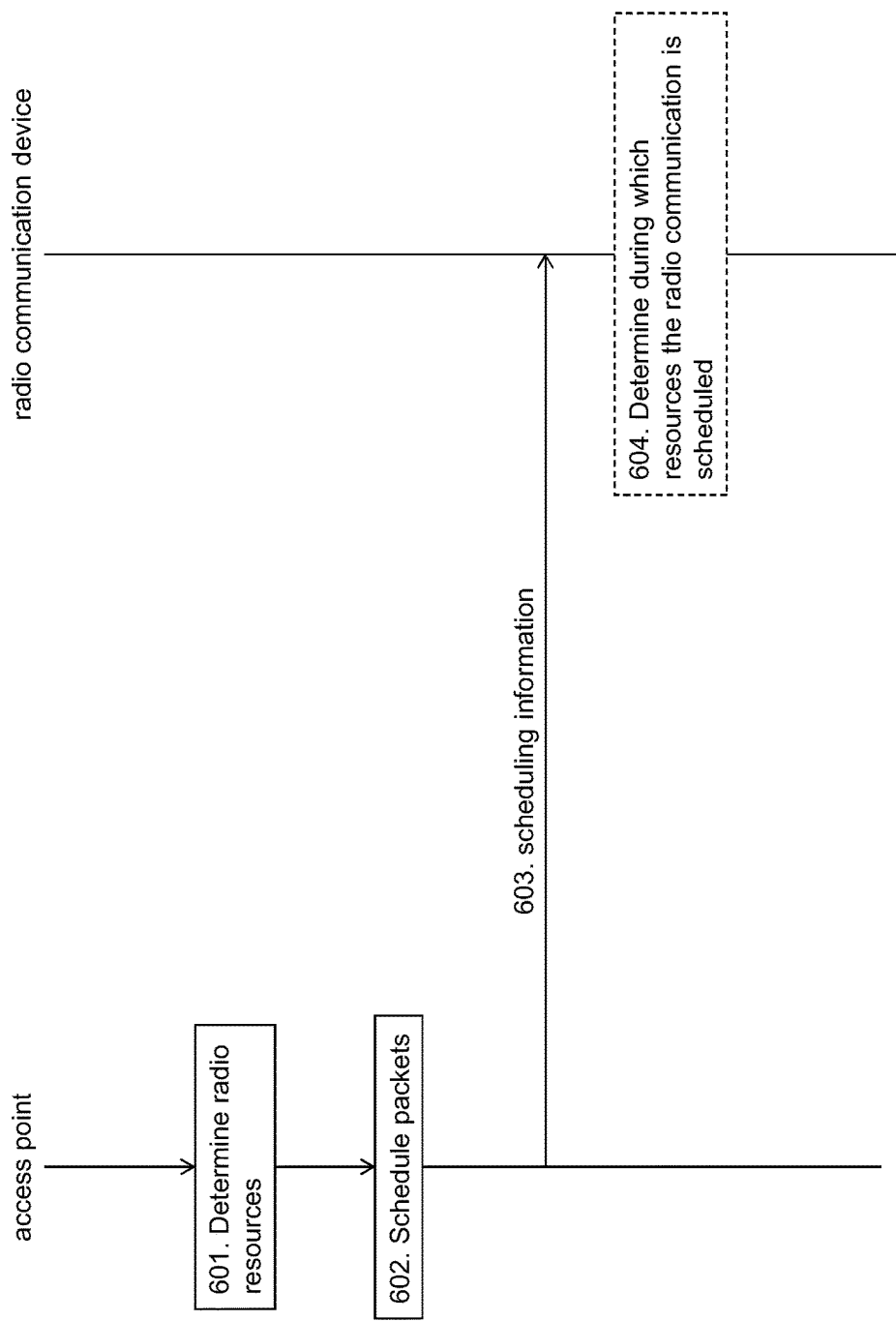
FIG. 6 shows an exemplary signaling diagram between an access point and a radio communication device.

In FIG. 6, an exemplary signaling diagram between an access point and a radio communication device is illustrating some of the embodiments as described herein. Further details of the embodiments are provided in relation to FIGS. 7-13. In FIG. 6, in block 601, the procedure starts with that an access point determines radio resources which are needed for one (or more) packet to be sent/transmitted to a radio communication device. At block 602, the packet(s) are scheduled without segmentation on radio resources, and all the necessary amount of radio resources, that a transmission of the at least one packet will need, is scheduled at a time. Then at block 603, the scheduling information is transmitted from the access point to a radio communication device. The scheduling information is received at the radio communication device. The scheduling information indicates the scheduled resources for the one (or more) packet to the radio communication device. According to some embodiments as described herein, the radio communication device may then, at block 604, determine, based on the received scheduling information, during which resources the radio communication device is scheduled and based on this it determines during which resources the radio communication device is able to sleep and thus save power.

As an example, one embodiment provides a method in an access point adapted to schedule transmissions of packets to and from a radio communication device, the method comprising determining radio resources needed for packets to be sent to a radio communication device, scheduling the packets without segmentation on radio resources, wherein the packet may have an arbitrary size that is smaller than a determined maximum block size, and transmitting scheduling information indicating the scheduled resources to the radio communication device. That the packet has an arbitrary size means that the size is not predetermined but could possibly be any suitable size. In some embodiments the packets may comprise IP packets.

Another example embodiment provides an access point adapted to schedule transmissions of packets from and to a radio communication device. The access point comprises a receiver, a transmitter, a memory, and a processing circuit, where the processing circuit is configured to determine radio resources needed for packets to be sent to a radio communication device, schedule the packets without segmentation on radio resources, where the packet has an arbitrary size that is smaller than a determined maximum block size, and transmit scheduling information indicating the scheduled resources to the radio communication device.

According to some embodiments, the access point has one or more IP packets that are to be transmitted to a radio communication device on a downlink channel. The access point may schedule the IP packets on radio resources in as many subframes as needed since the length of radio resources in the time domain is flexible. In some embodiments the scheduling may be performed by a scheduling circuit in the processing circuit of the access point. In other embodiments the scheduling may be performed by a scheduler associated with the access point. In some embodiments the access point determines scheduling information that indicates and/or includes which radio resources contain the scheduled IP packets. The scheduling information is transmitted to the radio communication device.

The access point may according to some embodiments further indicate in the scheduling information which resources that a radio communication device is assigned to use for uplink transmission. In some embodiments, the radio resources may have a flexible TTI length in time the domain. The scheduling information is transmitted to the radio communication device from the access point. According to some embodiments, the scheduling information may indicate scheduled resources in the same frame as the frame where the scheduling information is received. According to some embodiments, the scheduling information may indicate scheduled resources in subsequent frames to the frame where the scheduling information is received. According to some embodiments the scheduling information is transmitted to the radio communication device on a dedicated downlink channel.

Another example embodiment provides a method in a radio communication device for receiving scheduling information from an access point, the method comprising receiving scheduling information from the access point, the scheduling information indicates resources scheduled for a packet of arbitrary size smaller than a determined maximum block size.

Another example embodiment provides a radio communication device for receiving scheduling information from an access point. The radio communication device comprises a receiver, a transmitter, a memory, and a processing circuit, where the processing circuit is configured to receive scheduling information from the access point, where the scheduling information indicates resources scheduled for a packet of arbitrary size smaller than a determined maximum block size.

According to some embodiments, the radio communication device may receive scheduling information from the access point. The scheduling information may include information and/or indications on which resources that it may receive signals from the access point. If the scheduling information indicates that the radio communication device is scheduled for multiple frames, the radio communication device may also read the scheduling information for the next frame. The scheduling information may also indicate a grant to use specific resources. The radio communication device may then prepare a transmission and transmit to the access point on the granted resources. In some embodiments, the dedicated downlink transmissions may contain scheduling information for the next downlink or uplink transmission, and in some embodiments, the uplink transmissions may provide buffer status reports or requests for uplink transmission grants.

According to some embodiments, the determined maximum block size may comprise a Maximum Transfer Unit, MTU, size.

According to some embodiments, the flexible transmission scheme is used for transmitting signals between the radio communication device and the access node.

Figure 7:
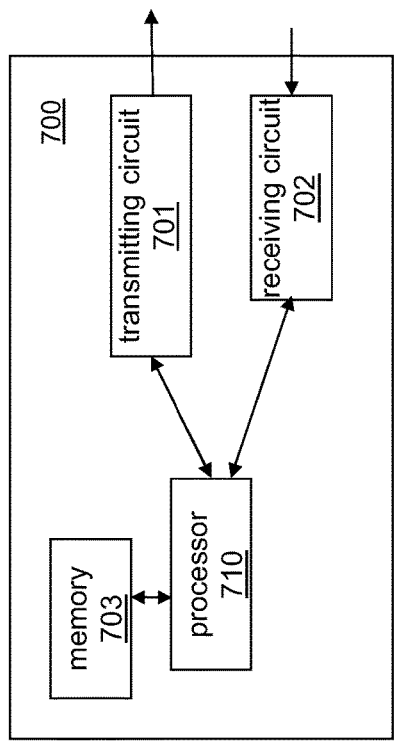
FIG. 7 shows an exemplary arrangement for an access point.

To perform at least some of the embodiments described herein, an access point 700 may comprise the arrangement shown in FIG. 7. The access point 700 may be adapted to be comprised in a wireless communications system and additionally/alternatively the access point 700 may be adapted to communicate with a radio communication device 800.

The access point 700 may comprises a receiving circuit 701 configured to receive signals, a transmitting circuit 702 configured to transmit signals, a memory 703 and a processing circuit 710. In some embodiments, the receiving circuit 701 may be referred to as a receiver and the transmitting circuit 702 may be referred to as a transmitter. The access point 700 is operative to perform the functions as described below. That the access point is operative may also mean that the access point is configured or adapted to perform the functions as described below.

The access point 700 is operative to determine radio resources needed for at least one packet to be sent to the radio communication device 800. Also, the access point 700 is operative to schedule the at least one packet without segmentation on radio resources, whereby all the necessary amount of radio resources that a transmission of the at least one packet will need can be scheduled at a time. Also, the access point 700 is operative to transmit scheduling information indicating the scheduled resources to the radio communication device 800. The scheduling information may be transmitted to the radio communication device 800 in beginning of a frame, said frame being a time interval used for data transmission on the radio physical channel. The scheduling information may indicate scheduled resources in the same frame as the frame where the scheduling information is transmitted and additionally or alternatively the scheduling information may indicate scheduled resources in subsequent frames to the frame where the scheduling information is transmitted. The scheduling information may be transmitted to the radio communication device 800 on a dedicated downlink channel. The scheduling information may be transmitted to the radio communication device together with user data transmission on a dedicated downlink channel. Additionally, the scheduling information may further indicate resources that the radio communication device 800 is assigned to use for uplink transmission.

The access point 700 may be further operative to determine radio resources needed for at least one packet by determining a number of Atomic Scheduling Units needed in time domain and/or frequency domain based on the size of the at least one packet. The Atomic Scheduling Unit, ASU, is the smallest schedulable radio resource, defined by time and bandwidth, which can be scheduled at a time to any radio communication device. The size of the at least one packet may be smaller than a determined maximum block size and the determined maximum block size comprises a Maximum Transfer Unit, MTU, size.

The embodiments disclosed herein, e.g. scheduling transmissions of packets to and/or from a radio communication device 800, may be implemented through one or more processing circuits, such as processing circuit 710 in the access point 700 depicted in FIG. 7, together with computer program code performing the functions and actions of the embodiments herein. The program code mentioned above may also be provided as a computer program product, for instance in the form of a data carrier carrying computer program code for performing the embodiments herein when being loaded into the access point 700, e.g. loaded into the processing circuit 710 in the access point 700. One such carrier may be in the form of a CD ROM disc. It is however feasible with other data carriers, such as a memory stick, Flash memory, a ROM, a RAM etch or other carriers such as an electronic signal, optical signal, radio signal etc. The computer program code may furthermore be provided as pure program code on a server and downloaded to the access point.

According to some of the embodiments described herein, the access point 700 further comprises a memory 703. The memory may be arranged to be used to store executable instructions and data to perform the embodiments described herein when being executed in the access point 700. In some embodiments, the processing circuit 710 and the memory 703 described above may refer to a combination of analog and digital circuits, and/or one or more processors configured with software and/or firmware, e.g. stored in memory 703, that when executed by one or more processors such as the processing circuit 710 above perform the embodiments as described herein. One or more of these processors, as well as other digital hardware, may be included in a single application-specific integrated circuit, ASIC, or several processors and various digital hardware may be distributed among several separate components, whether individually packaged or assembled in to a system-on-a-chip, SoC.

From the above paragraphs it may be seen that some embodiments may comprise a computer program, comprising instructions which, when executed on at least one processor, cause the at least one processor to carry out the method to schedule transmissions of packets to and/or from the radio communication device 800. Also, some embodiments may further comprise a carrier containing the computer program as described above, wherein the carrier is one of an electronic signal, optical signal, radio signal, or computer readable storage medium.

Figure 8:
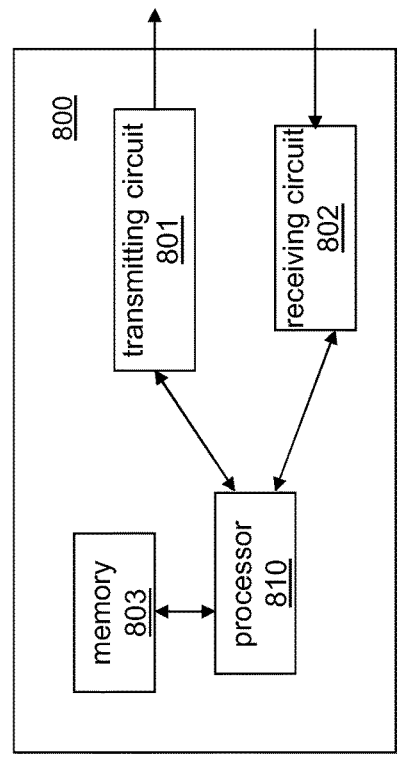
FIG. 8 shows an exemplary arrangement for a radio communication device.

To perform at least some of the embodiments described herein, a radio communication device 800 may comprise the following arrangement shown in FIG. 8. The radio communication device 800 may be adapted to be comprised in a wireless communications system and additionally or alternatively the radio communication device is adapted to communicate with the access point 700.

The radio communication device 800 comprises a receiving circuit 801 configured to receive signals, a transmitting circuit 802 configured to transmit signals, a memory 803 and a processing circuit 810. In some embodiments, the receiving circuit 801 may be referred to as a receiver and the transmitting circuit 802 may be referred to as a transmitter. The radio communication device 800 is operative to perform the functions as described below. That the radio communication device is operative may also mean that the access point is configured or adapted to perform the functions as described below.

The radio communication device 800 is operative to receive scheduling information from the access point 700, where the scheduling information indicates resources scheduled for at least one packet, whereby all the needed resources are scheduled at a time. The scheduling information may be received in beginning of a frame, said frame being a time interval used for data transmission on the radio physical channel. The scheduling information may indicate scheduled resources in the same frame as the frame where the scheduling information is received and additionally or alternatively the scheduling information may indicate scheduled resources in subsequent frames to the frame where the scheduling information is received. The scheduling information may be received on a dedicated downlink channel. The scheduling information may be received together with user data transmission on a dedicated downlink channel. Additionally, the scheduling information may also indicate a grant to use specific resources.

The radio communication device 800 may be further operative to determine, based on the received scheduling information, during which resources the radio communication device is scheduled and based on this determining during which resources the radio communication device is able to sleep.

When the scheduling information also indicates a grant to use specific resources the radio communication device 800 may be further operative to transmit buffer status reports or requests for uplink transmission grants or uplink control signaling on the granted specific resources.

Embodiments disclosed herein, e.g. receiving scheduling information from an access point 700, may be implemented through one or more processing circuits, such as processing circuit 810 in the radio communication device 800 depicted in FIG. 8, together with computer program code performing the functions and actions of the embodiments herein. The program code mentioned above may also be provided as a computer program product, for instance in the form of a data carrier carrying computer program code for performing the embodiments herein when being loaded into the radio communication device 800, e.g. loaded into the processing circuit 810 in the radio communication device 800. One such carrier may be in the form of a CD ROM disc. It is however feasible with other data carriers, such as a memory stick, Flash memory, a ROM, a RAM etch or other carriers such as an electronic signal, optical signal, radio signal etc. The computer program code may furthermore be provided as pure program code on a server and downloaded to the radio communication device.

According to some of the embodiments described herein, the radio communication device 800 further comprises a memory 803. The memory may be arranged to be used to store executable instructions and data to perform the embodiments described herein when being executed in the radio communication device 800. In some embodiments, the processing circuit 810 and the memory 803 described above may refer to a combination of analog and digital circuits, and/or one or more processors configured with software and/or firmware, e.g. stored in memory 803, that when executed by one or more processors such as the processing circuit 810 above perform the embodiments as described herein. One or more of these processors, as well as other digital hardware, may be included in a single application-specific integrated circuit, ASIC, or several processors and various digital hardware may be distributed among several separate components, whether individually packaged or assembled in to a system-on-a-chip, SoC.

From the above paragraphs it may be seen that some embodiments may comprise a computer program, comprising instructions which, when executed on at least one processor, cause the at least one processor to carry out the method to receive scheduling information from the access point 700. Also, some embodiments may further comprise a carrier containing the computer program as described above, wherein the carrier is one of an electronic signal, optical signal, radio signal, or computer readable storage medium.

Figure 9:
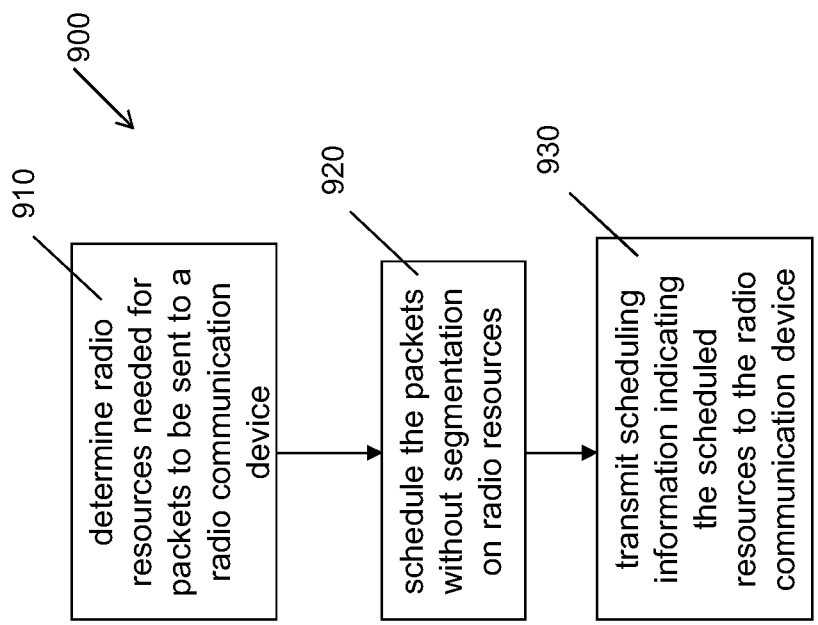
FIG. 9 shows an exemplary method performed in an access point.

FIG. 9 shows a method 900 performed in an access point 700 according to some embodiments described herein. The method 900 comprises determining radio resources needed for packets to be sent to a radio communication device 800 (block 910), and scheduling the packets without segmentation on the radio resources (block 910). The method 900 further comprises transmitting the scheduling information indicating the scheduled radio resources to the radio communication device 800 (block 930).

Example of embodiments of a method performed in an access point adapted to schedule transmissions of packets to and/or from a radio communication device will now be described in more details with reference to the flowchart depicted in FIG. 9. The actions described in relation to FIG. 9 may be performed in any suitable order, and is thus not limited to the order described below.

FIG. 9 is an illustrated example of action or operations which may be taken by the access point 700. The method may comprise the following actions.

Action 910

In this action, the method comprises determining radio resources needed for at least one packet to be sent to a radio communication device 800. In some embodiments, determining radio resources needed may comprise determining a number of Atomic Scheduling Units needed in time domain and/or frequency domain based on the size of the at least one packet. The Atomic Scheduling Unit, ASU, is the smallest schedulable radio resource, defined by time and bandwidth, which can be scheduled at a time to any radio communication device. According to some embodiments herein the size of the at least one packet is smaller than a determined maximum block size and the determined maximum block size comprises a Maximum Transfer Unit, MTU, size. The MTU size may be different for different types of radio communication networks. As one example, in Ethernet today the MTU size is 1492 or 1500 bytes, but for other network and future communication networks the MTU size may be a different size. As a second example, in Ethernet Jumbo the frame has a size of 1501-9198 bytes. Thus, the MTU size referred to above in these embodiments may be larger than the MTU sizes used in different radio communication networks today.

Action 920

After determining the radio resources needed for the at least one packet, the at least one packet is scheduled without segmentation on radio resources. This means that the method comprises scheduling the at least one packet without segmentation on radio resources, whereby all the necessary amount of radio resources that a transmission of the at least one packet will need can be scheduled at a time.

Action 930

After scheduling the at least one packet without segmentation on radio resources the scheduling information indicating the scheduled resources is transmitted. This means that the method further comprises transmitting scheduling information indicating the scheduled resources to the radio communication device 800. According to some embodiments, the scheduling information may be transmitted to the radio communication device 800 in beginning of a frame, said frame being a time interval used for data transmission on the radio physical channel. In some radio communication systems, such as LTE, a frame has 10 ms duration. In some embodiments, the scheduling information may indicate scheduled resources in the same frame as the frame where the scheduling information is transmitted. In some embodiments, the scheduling information may indicate scheduled resources in subsequent frames to the frame where the scheduling information is transmitted. The scheduling information may in some embodiments indicate scheduled resources in the same frame as the frame where the scheduling information is received. In other embodiments, the scheduling information may indicate scheduled resources in subsequent frames to the frame where the scheduling information is received. In some embodiments the scheduling information may indicate both scheduled resources in the same frame as the frame where the scheduling information is received and scheduled resources in subsequent frames to the frame where the scheduling information is received. According to some embodiments, the scheduling information may be transmitted to the radio communication device 800 on a dedicated downlink channel. According to some embodiments, the scheduling information may be transmitted to the radio communication device together with user data transmission on a dedicated downlink channel. In some embodiments, the scheduling information may further indicate resources that the radio communication device is assigned to use for uplink transmission. According to some embodiments, the method may comprise receiving an uplink request from a radio communication device. The uplink request may be received before sending the scheduling information indicating resources assigned to be used for uplink transmissions. In some embodiments, the uplink request may comprise a random access request. The request may, in some embodiments, be received together with an earlier granted uplink transmission. Additionally, according to some embodiments the access point may receive a buffer status report from a radio communication device.

Figure 10:
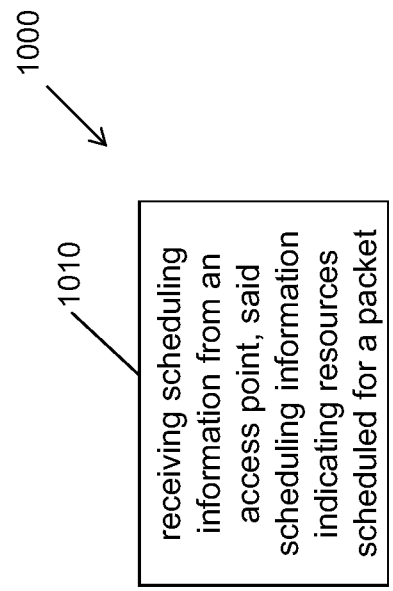
FIG. 10 shows an exemplary method performed in a radio communication device.

FIG. 10 shows a method 1000 performed in a radio communication device 800 according to some embodiments described herein. The method 1000 comprises receiving scheduling information from an access point 700, where the scheduling information indicates radio resources scheduled for a packet (block 1100).

Example of embodiments of a method performed in a radio communication device 800 adapted to receive scheduling information from an access point 700 will now be described in more details with reference to the flowchart depicted in FIG. 10.

Action 1010

In this action, the method comprises receiving scheduling information from the access point 700, the scheduling information indicates resources scheduled for at least one packet, whereby all the needed resources are scheduled at a time. In some embodiments, the scheduling information may be received in beginning of a frame, said frame being a time interval used for data transmission on the radio physical channel. According to some embodiments, the scheduling information may indicate scheduled resources in the same frame as the frame where the scheduling information is received. In some frames, the scheduling information indicates scheduled resources in subsequent frames to the frame where the scheduling information is received. The scheduling information may in some embodiments indicate scheduled resources in the same frame as the frame where the scheduling information is received. In other embodiments, the scheduling information may indicate scheduled resources in subsequent frames to the frame where the scheduling information is received. In some embodiments the scheduling information may indicate both scheduled resources in the same frame as the frame where the scheduling information is received and scheduled resources in subsequent frames to the frame where the scheduling information is received. According to some embodiments, the scheduling information may be received on a dedicated downlink channel. The scheduling information may be received together with user data transmission on a dedicated downlink channel. In some embodiments, the scheduling information may also indicate a grant to use specific resources for uplink transmissions. According to some of the embodiments described above, the size of the at least one packet is smaller than a determined maximum block size and the determined maximum block size comprises a Maximum Transfer Unit, MTU, size.

Figure 11:
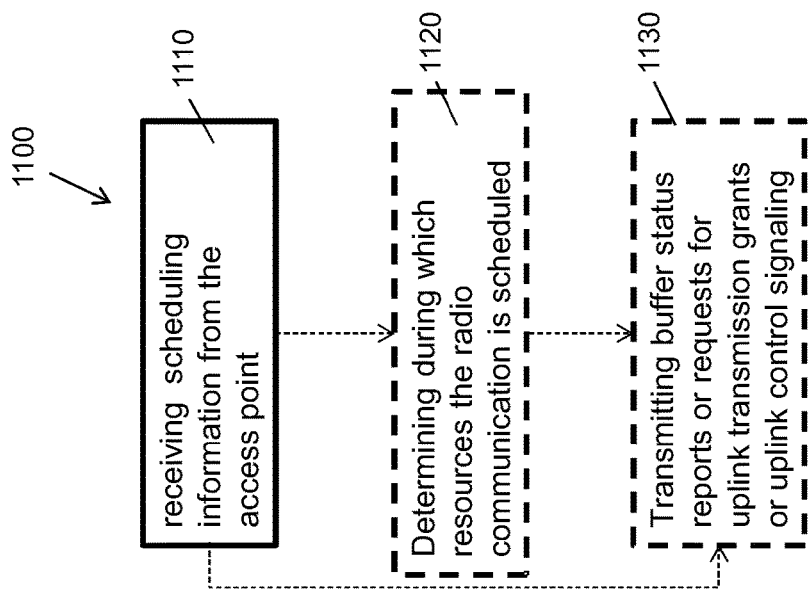
FIG. 11 shows an exemplary method performed in a radio communication device.

Further example of embodiments of a method performed in a radio communication device 800 adapted to receive scheduling information from an access point 700 will now be described in more details with reference to the flowchart depicted in FIG. 11. The actions described in relation to FIG. 11 may be performed in any suitable order, and is thus not limited to the order described below. The dotted lines in the figure are illustrating that the actions are not mandatory actions, but may be performed in some of the embodiments as described herein.

Action 1110

In this action, the method comprises receiving scheduling information from the access point 700, the scheduling information indicates resources scheduled for at least one packet, whereby all the needed resources are scheduled at a time. In some embodiments, the scheduling information may be received in beginning of a frame, said frame being a time interval used for data transmission on the radio physical channel. According to some embodiments, the scheduling information may indicate scheduled resources in the same frame as the frame where the scheduling information is received. In some frames, the scheduling information indicates scheduled resources in subsequent frames to the frame where the scheduling information is received. The scheduling information may in some embodiments only indicate scheduled resources in the same frame as the frame where the scheduling information is received. In other embodiments, the scheduling information may only indicate scheduled resources in subsequent frames to the frame where the scheduling information is received. In some embodiments the scheduling information may indicate both scheduled resources in the same frame as the frame where the scheduling information is received and scheduled resources in subsequent frames to the frame where the scheduling information is received. According to some embodiments, the scheduling information may be received on a dedicated downlink channel. The scheduling information may be received together with user data transmission on a dedicated downlink channel. In some embodiments, the scheduling information may also indicate a grant to use specific resources for uplink transmissions. According to some embodiments, the method may comprise sending an uplink request to an access point 700. The uplink request may be sent before receiving the grant to use specific resources for uplink transmissions. In some embodiments, the uplink request may comprise sending a random access request to the access point. The request may, in some embodiments, be sent together with an earlier granted uplink transmission. Additionally, according to some embodiments, the method may comprise transmitting a buffer status report to an access point.

According to some of the embodiments described above, the size of the at least one packet is smaller than a determined maximum block size and the determined maximum block size comprises a Maximum Transfer Unit, MTU, size. The MTU size may be different for different types of radio communication networks, e.g. in Ethernet an MTU is 1492 or 1500 bytes. The MTU size referred to above in these embodiments may be larger than the MTU sizes used in different radio communication networks today.

Action 1120

In this action, after receiving the scheduling information, in some embodiments determination about during which resources the radio communication device 800 is able to sleep is done. This means that the method comprises determining, based on the received scheduling information, during which resources the radio communication device 800 is scheduled and based on this determines during which resources the radio communication device 800 is able to sleep. The radio communication devices may be allowed to sleep when there is no data to transmit or receive. The scheduling information may in some embodiments contain information during which resources the radio communication device is scheduled, and thus the radio communication device also know during which resources it is not scheduled. Hence, the radio communication device may according to some embodiments sleep during those resources that it is not scheduled.

Action 1130

After receiving the scheduling information and when the scheduling information indicates a grant to use specific resources for uplink transmission, the method may in some embodiments comprise transmitting one of a buffer status report, a request for uplink transmission grants and uplink control signaling on the granted specific resource. This means that the method comprises transmitting buffer status reports or requests for uplink transmission grants or uplink control signaling on the granted specific resources. In some embodiments, the uplink request may comprise a random access request.

Figure 12:
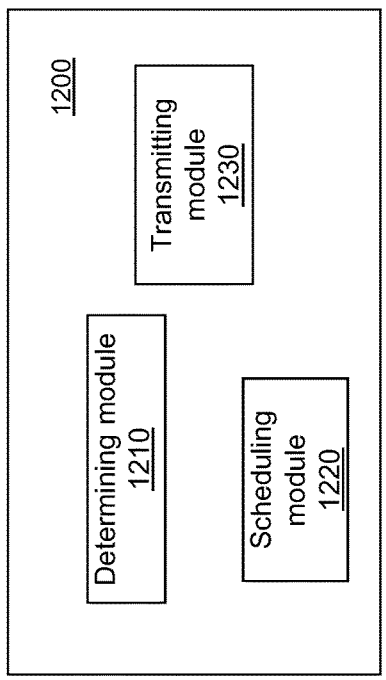
FIG. 12 shows an exemplary arrangement for an access point.

To perform at least some of the embodiments described herein, an access point 1200 may comprise the arrangement shown in FIG. 12. The access point 1200 may be adapted to be comprised in a wireless communications system and additionally or alternatively the access point 1200 may be adapted to communicate with a radio communication device 1300.

The access point 1200 may comprise a determining module 1210, a scheduling module 1220 and a transmitting module 1230. The determining module 1210, the scheduling module 1220 and the transmitting module 1230 may be configured to perform the functions as described below.

The determining module 1210 may be configured to determine radio resources needed for at least one packet to be sent to the radio communication device 1300.

The scheduling module 1220 may be configured to schedule the at least one packet without segmentation on radio resources, whereby all the necessary amount of radio resources that a transmission of the at least one packet will need can be scheduled at a time.

The transmitting module 1230 may be configured to transmit scheduling information indicating the scheduled resources to the radio communication device 1300. The transmitting module 1230 may be further configured to transmit the scheduling information to the radio communication device 1300 in beginning of a frame, said frame being a time interval used for data transmission on the radio physical channel. The scheduling information may indicate scheduled resources in the same frame as the frame where the scheduling information is transmitted and additionally or alternatively the scheduling information may indicate scheduled resources in subsequent frames to the frame where the scheduling information is transmitted. The transmitting module 1230 may be further configured to transmit the scheduling information to the radio communication device 1300 on a dedicated downlink channel. Additionally, the scheduling information may further indicate resources that the radio communication device 1300 is assigned to use for uplink transmission.

Figure 13:
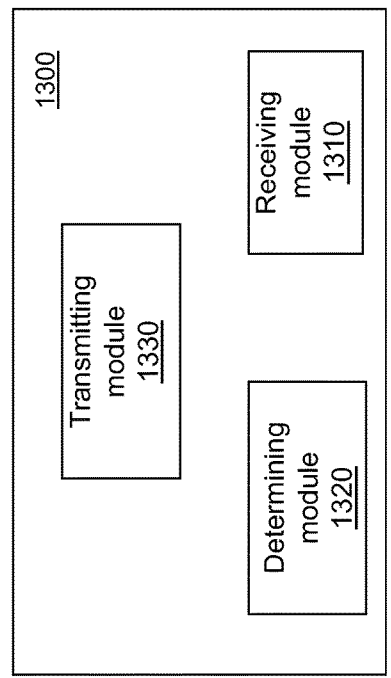
FIG. 13 shows an exemplary arrangement for a radio communication device.

To perform at least some of the embodiments described herein, a radio communication device 1300 may comprise the arrangement shown in FIG. 13. The radio communication device 1300 may be adapted to be comprised in a wireless communications system and additionally or alternatively the radio communication device 1300 may be adapted to communicate with an access point 1200.

The radio communication device 1300 may comprise a receiving module 1310, a determining module 1320 and a transmitting module 1330. The receiving module 1310, the determining module 1320 and the transmitting module 1330 may be configured to perform the functions as described below.

The receiving module 1310 may be configured to receive scheduling information from the access point 1200, where the scheduling information indicates resources scheduled for at least one packet, whereby all the needed resources are scheduled at a time. The receiving module may be configure to receive the scheduling information in beginning of a frame, said frame being a time interval used for data transmission on the radio physical channel. The scheduling information may indicate scheduled resources in the same frame as the frame where the scheduling information is received and additionally or alternatively the scheduling information may indicate scheduled resources in subsequent frames to the frame where the scheduling information is received. The receiving module may be configured to receive the scheduling information on a dedicated downlink channel. The scheduling information may also indicate a grant to use specific resources.

The determining module 1320 may be configured to determine, based on the received scheduling information, during which resources the radio communication device is scheduled and based on this determining during which resources the radio communication device is able to sleep.

The transmitting module 1330 may be configured to transmit buffer status reports or requests for uplink transmission grants or uplink control signaling on the granted specific resources when the scheduling information has indicated a grant to use the specific resources.

Various elements disclosed herein are described as some kind of circuit, e.g., a processing circuit. Each disclosed circuit may be embodied in hardware and/or in software, including firmware, resident software, microcode, etc., executed on a controller or processor, including an application specific integrated circuit, ASIC.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method implemented in an access point adapted to schedule transmissions of packets to and/or from a radio communication device, the method comprising:
  determining radio resources necessary for at least one packet to be sent to a radio communication device;
  scheduling the at least one packet without segmentation on radio resources such that all the determined necessary radio resources for the at least one packet can be scheduled at a time; and transmitting, on a downlink data channel, scheduling information together with user data, the scheduling information indicating the scheduled radio resources to the radio communication device and a time designation of a next control message to monitor.

2. The method according to claim 1, wherein determining the necessary radio resources comprises determining a number of Atomic Scheduling Units needed in at least one of a time domain and a frequency domain based on a size of the at least one packet.

3. The method according to claim 1, wherein transmitting the scheduling information comprises transmitting the scheduling information to the radio communication device in a beginning of a frame, said frame comprising a time interval used for data transmission.

4. The method according to claim 3, wherein the scheduling information indicates scheduled resources in the same frame as the frame where the scheduling information is transmitted.

5. The method according to claim 3, wherein the scheduling information indicates scheduled resources in subsequent frames to the frame where the scheduling information is transmitted.

6. The method according to claim 1, wherein transmitting the scheduling information on the downlink data channel comprises transmitting the scheduling information together with the user data to the radio communication device on a dedicated downlink data channel.

7. The method according to claim 1, wherein the scheduling information further indicates resources that the radio communication device is assigned to use for uplink transmission.

8. The method according to claim 1, wherein a size of the at least one packet is smaller than a determined maximum block size, and wherein the determined maximum block size comprises a Maximum Transfer Unit (MTU) size.

9. An access point adapted to schedule transmissions of packets to and/or from a radio communication device, the access point comprising:
a processing circuit configured to:
determine radio resources necessary for at least one packet to be sent to the radio communication device; and
schedule the at least one packet without segmentation on radio resources such that all the determined necessary radio resources for the at least one packet can be scheduled at a time; and
a transmitter configured to transmit, on a downlink data channel, scheduling information together with user data, the scheduling information indicating the scheduled radio resources to the radio communication device and a time designation of a next control message to monitor.

10. The access point according to claim 9, wherein the processing circuit determines the necessary radio resources by determining a number of Atomic Scheduling Units needed in at least one of a time domain and a frequency domain based on a size of the at least one packet.

11. The access point according to claim 9, wherein the transmitter transmits the scheduling information to the radio communication device in a beginning of a frame, said frame comprising a time interval used for data transmission.

12. The access point according to claim 11, wherein the scheduling information indicates scheduled resources in the same frame as the frame where the scheduling information is transmitted.

13. The access point according to claim 11, wherein the scheduling information indicates scheduled resources in subsequent frames to the frame where the scheduling information is transmitted.

14. The access point according to claim 9, wherein the transmitter transmits the scheduling information together with the user data to the radio communication device on a dedicated downlink data channel.

15. The access point according to claim 9, wherein the scheduling information further indicates resources that the radio communication device is assigned to use for uplink transmission.

16. The access point according to claim 9, wherein a size of the at least one packet is smaller than a determined maximum block size, and wherein the determined maximum block size comprises a Maximum Transfer Unit (MTU) size.

17. A method implemented in a radio communication device adapted to receive scheduling information from an access point, the method comprising:
receiving, via a downlink data channel, scheduling information together with user data from the access point, the received scheduling information indicating a time designation of a next control message to monitor and radio resources scheduled for at least one packet such that all the radio resources necessary for the at least one packet are scheduled at a time.

18. The method according to claim 17, wherein receiving the scheduling information comprising receiving the scheduling information in a beginning of a frame, said frame comprising a time interval used for data transmission.

19. The method according to claim 18, wherein the scheduling information indicates scheduled resources in the same frame as the frame where the scheduling information is received.

20. The method according to claim 18, wherein the scheduling information indicates scheduled resources in subsequent frames to the frame where the scheduling information is received.

21. The method according to claim 17, wherein receiving the scheduling information comprises receiving the scheduling information together with the user data on a dedicated downlink data channel.

22. The method according to claim 17, further comprising:
determining, based on the received scheduling information, during which radio resources the radio communication device is scheduled; and
based on this determining, during which radio resources the radio communication device is able to sleep.

23. The method according to claim 17 wherein the scheduling information also indicates a grant to use specific resources for uplink transmissions.

24. The method according to claim 23, further comprising:
transmitting buffer status reports or requests for uplink transmission grants or uplink control signaling on the granted specific resources.

25. The method according to claim 17, wherein a size of the at least one packet is smaller than a determined maximum block size, and wherein the determined maximum block size comprises a Maximum Transfer Unit (MTU) size.

26. A radio communication device adapted to receive scheduling information from an access point, where the radio communication device comprises:
a receiver configured to receive, via a downlink data channel, scheduling information together with user data from the access point; and a processing circuit configured to determine, from the received scheduling information, a time designation of a next control message to monitor and radio resources scheduled for at least one packet such that all the radio resources necessary for the at least one packet are scheduled at a time.

27. The radio communication device according to claim 26, wherein the receiver receives the scheduling information in a beginning of a frame, said frame comprising a time interval used for data transmission.

28. The radio communication device according to claim 27, wherein the scheduling information indicates scheduled resources in the same frame as the frame where the scheduling information is received.

29. The radio communication device according to claim 27, wherein the scheduling information indicates scheduled resources in subsequent frames to the frame where the scheduling information is received.

30. The radio communication device according to claim 26, wherein the receiver receives the scheduling information together with the user data on a dedicated downlink data channel.

31. The radio communication device according to claim 26, wherein the processing circuit is configured to:
determine, based on the received scheduling information, during which radio resources the radio communication device is scheduled; and
based on this determination, during which radio resources the radio communication device is able to sleep.

32. The radio communication device according to claim 26, wherein the scheduling information also indicates a grant to use specific resources.

33. The radio communication device according to claim 32, wherein the radio communication device further comprises a transmitter configured to:
transmit buffer status reports or requests for uplink transmission grants or uplink control signaling on the granted specific resources.

34. A computer program product stored in a non-transitory computer readable medium for controlling a processor in an access point, the computer program product comprising software instructions which, when run on the processor, cause the access point to:
determine radio resources necessary for at least one packet to be sent to a radio communication device;
schedule the at least one packet without segmentation on radio resources such that all the determined necessary radio resources for the at least one packet can be scheduled at a time; and
transmit, on a downlink data channel, scheduling information together with user data, the scheduling information indicating the scheduled radio resources to the radio communication device and a time designation of a next control message to monitor.

35. A computer program product stored in a non-transitory computer readable medium for controlling a processor in a radio communication device, the computer program product comprising software instructions which, when run on the processor, cause the radio communication device to:
receive, via a downlink data channel, scheduling information together with user data from the access point, the scheduling information indicating a time designation of a next control message to monitor and radio resources scheduled for at least one packet such that all the radio resources necessary for the at least one packet are scheduled at a time.

36. An access point adapted to schedule transmissions of packets to and/or from a radio communication device, wherein the access point comprises:
a determining circuit configured to determine radio resources necessary for at least one packet to be sent to the radio communication device;
a scheduling circuit configured to schedule the at least one packet without segmentation on radio resources such that all the determined necessary radio resources for the at least one packet can be scheduled at a time; and
a transmitter configured to transmit, on a downlink data channel, scheduling information together with user data, the scheduling information indicating the scheduled radio resources to the radio communication device and a time designation of a next control message to monitor.

37. A radio communication device adapted to receive scheduling information from an access point, wherein the radio communication device comprises:
a receiver configured to receive, via a downlink data channel, scheduling information together with user data from the access point; and
a processing circuit configured to determine, from the received scheduling information, a time designation of a next control message to monitor and radio resources scheduled for at least one packet such that all the radio resources necessary for the at least one packet are scheduled at a time.

* * * * *